BENEFICIATION OF TITANIFEROUS ORES

James H. Chen, Corpus Christi, Tex., assignor to Benilite Corporation of America, New York, N.Y.
No Drawing. Continuation-in-part of abandoned application Ser. No. 866,548, Oct. 15, 1969. This application July 19, 1971, Ser. No. 163,805
Int. Cl. C01g 23/04; C02b 3/00
U.S. Cl. 75—101

6 Claims

ABSTRACT OF THE DISCLOSURE

During the beneficiation of titaniferous iron ores by leaching thereof in a vessel with about 20% liquid hydrochloric acid, the required heat is supplied by introducing about 20% hydrochloric acid vapor into the vessel as the sole heat exchange medium.

---

This application is a continuation-in-part of U.S. application Ser. No. 866,548, filed Oct. 15, 1969, and now abandoned.

The present invention relates to a process for the beneficiation with hydrochloric acid of ilmenite or other iron-containing titaniferous ores. More particularly, it is an improved method of extracting iron and other acid-soluble constituents from titaniferous iron ores, particularly ilmenite, with hydrochloric acid preferably recovered from the waste leach solution of the extraction process, to produce "beneficiated ilmenite," also known as "synthetic rutile" or "upgraded ilmenite," of high titanium dioxide content and low in iron, suitable as raw material for the manufacture of titanium tetrachloride for titanium dioxide pigment and other titanium compounds, by the "chlorination" (or "chloride") process.

Natural rutile, which is now the important raw material for the manufacture of titanium dioxide pigment by the "chlorination" (or "chloride") process, is in rapidly increasing demand. However, due to the limited reserve and production capacities, and increasing cost of production, the supply of natural rutile is becoming a problem. On the other hand, there are much greater deposits of ilmenite all over the world, and the production of "beneficiated ilmenite" (or "synthetic rutile") as a substitute for natural rutile is becoming increasingly important.

Many attempts have been made heretofore to beneficiate ilmenite, but few have succeeded, mainly because of cost factors and/or waste disposal problems. The only process which has been used on a commercial scale to date is the acid leaching process for the beneficiation of ilmenite by leaching ilmenite with 31.5% (20° Bé.) hydrochloric acid (HCl). However, this process still has two major problems. One is the heavy consumption of hydrochloric acid and the other is the disposal of large quantities of iron chloride solution.

The present invention makes it possible to utilize the hydrochloric acid recovered from the waste leach solution of the extraction process, thus solving the two said problems with one stroke. By recovering the hydrochloric acid from the waste leach solution for re-use, the hydrochloric acid consumption is reduced to a minimum. Only a small amount of make-up acid, less than 5% of the total acid requirement, is necessary for compensating losses and spillage. The other product from the recovery process is ferric oxide, which is a solid and has a ready market to steel mills. There is no longer a pollution problem.

Process for recovery of hydrochloric acid from waste leach liquor is known, and is not a part of this invention. Briefly, the process is a method of hydrolyzing iron chloride at high temperature by direct contact with combustion gases. The chemical reactions involved are:

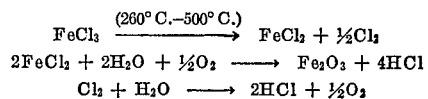

The products of reaction are, therefore, ferric oxide and hydrogen chloride. Ferric oxide is recovered in solid form. Hydrogen chloride is recovered in water solution as hydrochloric acid with a concentration of about 20% HCl by weight, which is the azeotropic mixture of hydrochloric acid and water.

The hydrochloric acid recovery process has been known for years. However, the recovered acid has not been utilized commercially for the beneficiation of ilmenite by HCl leaching process, which has also been known for years. The problem is due to the fact that the recovered acid by commercially proven process has a concentration of only about 20% HCl by weight. It is possible to break the azeotropic condition by using sulfuric acid or calcium chloride in order to concentrate the hydrochloric acid to a commercial strength of 31.5% HCl by weight. But this operation is costly and the use of this high cost recovered acid will render the beneficiation process uneconomical. The problem involved may be further explained as follows:

(1) For effective extraction of iron and other acid-soluble impurities from ilmenite, the hydrochloric acid requires a certain strength. About 20% by weight HCl is a good concentration for leaching purpose. Weaker acid is less efficient. Higher concentrations of hydrochloric acid would cause dissolution in the leach liquor of more of the titanium contained in the ilmenite, which solubilized titanium in the waste leach liquor would lower the recovered titanium and would cause a corrosion problem and difficulty in the regenerating or recovering of hydrochloric acid therefrom.

(2) The reaction between hydrochloric acid and ilmenite is exothermic, but the heat of reaction is not sufficient to raise the temperature of the mixture to and maintain it at the desired degree. Therefore, additional heat is required.

(3) In laboratory experiments, heating a mixture of hydrochloric acid and ilmenite can easily be applied externally by a burner or a hot plate. In commercial application, however, it is not practical to provide heat externally to a large vessel (or digester) which is lined with rubber and acid-resistant bricks, because of poor heat transfer. It is also impractical to heat internally with steam coils or electric heating elements, because the highly corrosive nature of hot hydrochloric acid in the digester causes attack of such coils or elements.

(4) One practical way to heat such a digester is by the injection of live steam into the digester. However, the steam will condense and dilute the acid concentration; although it is workable if more concentrated acid, such as 31.5% HCl by weight, is initially used.

(5) If the initial concentration of the leaching acid is only about 20% HCl by weight, such as recovered acid from waste leach solution, further dilution by steam condensate will make leaching inefficient.

(6) On the other hand, to concentrate further recovered or fresh about 20% HCl by weight into 31.5% HCl by weight is uneconomical.

This, therefore, was the problem. For many years, although the hydrochloric acid recovery process has been commercialized, the recovered about 20% HCl could not be utilized for the beneficiation of ilmenite on a commercial scale.

The present invention, which uses the vapor of about 20% HCl by weight in lieu of steam for heating the leach liquor, solves this difficult problem. By avoiding dilution of acid strength in the digester, it eliminates the necessity of further concentrating the recovered acid, with the result of a practical and economical process for the beneficiation of ilmenite without pollution problems.

According to the process of the invention, ilmenite or other titaniferous iron ores, depending upon the ferric iron and ferrous iron contents in the ore, may be first subjected to a certain degree of reduction by roasting in a furnace or a rotary kiln by conventional techniques, e.g., with coke or oil or other carbonaceous materials at about 1500° F. (815° C.) to about 2000° F. (1090° C.) to convert most of the ferric iron to ferrous iron. This reduction technique is known and is not a part of this invention. The pre-reduced ilmenite is charged into a vessel (digester) lined with acid-resistant material. About 20% by weight hydrochloric acid, preferably hot regenerated or recovered about 20% HCl, is added into the vessel (digester) which rotates slowly during digestion. Vapor of about 20% by weight hydrochloric acid is generated in an acid evaporator and introduced into the vessel (digester) for heating purpose. As is well known, such vapors inherently have sensible heat and latent heat of condensation. Being the azeotropic mixture, the vapor of the about 20% hydrochloric acid also contains about 20% HCl by weight.

The extraction process can be carried out in one, two or more stages, although it is normally carried out by two stages of leaching. In the two-stage process, both stages may use "fresh" or "straight" (unmixed or undiluted) about 20% hydrochloric acid or a two-stage counter-current procedure may be adopted. In the latter case, the second stage leaching uses "straight" about 20% HCl while the first stage leaching uses a mixture of about 20% HCl and the second stage waste leach liquor from a previous batch, which still contains some free HCl. Heating of both stages is done by about 20% HCl vapor.

Leaching can be done in each stage under atmospheric pressure at about 226° F. (108° C.) or under higher pressure at a higher temperature. For more satisfactory extraction, both leaching stages should proceed under pressure of from about 20 p.s.i.g. to about 50 p.s.i.g. and an operating temperature range of from about 240° F. (115° C.) to about 300° F. (149° C.). The temperature and pressure of the digester is controlled by the temperature, pressure and rate of feeding of the about 20% HCl vapor.

Under these operating conditions, each leaching step would require from about 3 to about 6 hours. Exact time cycle would depend on type and properties of the raw material (ilmenite or other titaniferous iron ore).

After leaching, the waste leach liquor containing acid-soluble iron chloride is separated from the acid-insoluble titanium values. About 20% HCl is recovered from the waste leach liquor for re-use in the process, with small amounts of make-up. The solid portion is washed with water, filtered and dried or calcined. It is the product "beneficiated ilmenite."

Total amount of acid used or required for leaching, including HCl condensed from about 20% HCl vapor during digestion, may range from about 2 to about 3.5 parts by weight of about 20% by weight HCl per one part of ilmenite. The actual amount required is directly dependent on the iron content and the acid-soluble non-titanium values of the ore. Generally, 15-20% by weight stoichiometric excess of acid should be provided for maximum extraction of iron and other acid-soluble materials in the ore.

In the case of two-stage "fresh" or "straight" about 20% HCl leaching, the first stage may use about 55% and second stage about 45% of the total acid required, i.e., approximately half or an equal amount of the hydrochloric acid is used in each stage.

In the case of two-stage counter-current leaching, the first stage may use half of the total acid required plus an approximately equal volume of the second stage waste leach liquor of a previous batch. The second stage may use the other half of the total requirement of the about 20% HCl.

The above stated amount of HCl for each stage includes the amount of about 20% HCl condensed from about 20% HCl vapor used as the heat exchange medium.

For either low grade ilmenite or for higher extraction efficiency, a three stage leach process could be used, whereas for either a very high grade ilmenite or for lower extraction efficiency, a single stage leach process could be used. In the single stage or three stage leach processes, the operating parameters of time, temperature, pressure and heat exchange medium would be as given above except in a three stage leach using only straight or fresh about 20% hydrochloric acid there would be used about 40% (first stage), about 30% (second stage) and about 30% (third stage) of the total acid required and except in a three stage counter-current leach process each stage would use about one-third of the total 20% hydrochloric acid required as supplemented in the first and second stages by an approximately equal volume of the waste leach liquor from the second and third stages, respectively, of a previous batch.

Typical extraction efficiency is such that about 90%-95% of the iron content is removed from the original ilmenite. Typical recovery of titanium value is about 95%-98% of the $TiO_2$ present in the original ilmenite.

Typical product, i.e., beneficiated ilmenite, contains 90%-95% $TiO_2$.

For commercial scale production, process equipment suggested for the preferred cyclic process of the invention for the beneficiation of ilmenite (or other titaniferous iron ores) is illustrated in the accompanying drawing. It should be noted that suitable types of equipment which would serve the same purposes could also be used. The leaching (digestion) equipment herewith illustrated is for batch operation, but continuous operation equipment can also be employed. 1 is a rotary spherical digester constructed of mild steel body and lined with rubber lining covered with acid-resistant bricks. For example, a digester of 16' O.D. can hold about 15 short tons of ilmenite in one batch. A 20' O.D. digester can hold about 35 short tons. 2 is a HCl evaporator constructed of impervious graphite heating blocks for evaporating the acid with steam in the shell side. 3 is a HCl constant head tank, made of impervious graphite or Haveg 41 (a reinforced phenol formaldehyde resin) material for control of the acid level and for separation of HCl vapor and liquid. About 20% HCl at about 196° F. (91° C.) is fed to the evaporator continuously to generate HCl vapor for heating up the digester. During digestion, pressure up to about 50 p.s.i.g. with corresponding temperature up to about 300° F. (149° C.) is maintained in the digester. After digestion is completed, the finished product is discharged from the manhole, dumped into a pumping tank 4, mixed with water and pumped to a filter. The filtered product after washing free from acid is then dried to obtain beneficiated ilmenite containing 90%-95% $TiO_2$, depending on the original composition of ilmenite (or titaniferous iron ore). The waste leach liquor containing mainly iron chlorides, both in the ferric and ferrous forms, and small amount of free HCl, usually is sent to a thickener, constructed of acid-proof material, to recover fine slime of $TiO_2$ and then the clear waste leach solution is pumped to the HCl recovery unit, described above, for the regeneration and recovery of HCl. The recovered acid in about 20% strength is reused for the digestion and/or for the vaporization thus completing the cycle of the process. Small requirement of less than 5% of make-up HCl is added into the system for compensating losses and spillage.

In short, the present invention, which embodies the novel and unique concept of employing about 20% HCl vapor for heating, makes it possible to use about 20% HCl recovered from waste leach solution, heretofore not usable commercially, for the beneficiation of ilmenite or other titaniferous iron ores. This process of the invention not only reduces the actual acid consumption to only about less than 5% of the total acid required, but also eliminates the almost impossible problem of disposing of large quantities of waste leach liquor containing iron chloride and free HCl. The result is a cyclic process, practical and economical for commercial operation.

The process of the invention is illustrated further by the following representative examples thereof. Example 1 was a two-stage "fresh" acid leaching process at atmospheric pressure; Example 2 was a two-stage counter-current acid leaching process at atmospheric pressure; while Example 3 was a two-stage "fresh" acid leaching process at elevated pressure. In all three examples about 20% HCl vapor was the sole heat exchange medium in the vessel or digester. In all three examples the waste leach liquor can be recovered or regenerated and reused or recycled as fresh or straight about 20% by weight HCl by the above described recovery process.

Example 1

"Quilon" ilmenite (produced in India), having the following weight percent analysis, was pre-reduced by conventional method:

| | Percent |
|---|---|
| $TiO_2$ | 59.55 |
| $Fe_2O_3$ | 22.73 |
| FeO | 10.77 |
| $Al_2O_3$ | 1.44 |
| $SiO_2$ | 1.41 |
| Others | Balance |

In the first stage leaching, 1.3 parts by weight of 20% by weight HCl were used per one part of ilmenite. The acid was preheated to about 212° F. (100° C.) and added into a glass flask (A) which contained the pre-reduced ilmenite. Flask (A) was heavily insulated to prevent heat loss. It was fitted with a vent open to the air and the unit was operated under atmospheric pressure.

In another glass flask (B), 20% by weight HCl vapor was generated by boiling 20% by weight aqueous HCl. The vapor was introduced into flask (A) through glass tubing to heat up its contents to and maintain them at a temperature of about 226° F. (108° C.) which is the boiling point of 20% by weight HCl under atmospheric pressure.

Small amount of excess HCl vapor not condensed in flask (A) was vented to the air through the vent of flask (A). This was kept at a minimum by adjusting the rate of evaporation in flask (B). During the course of first stage leaching, which lasted 5 hours, the amount of 20% by weight HCl introduced into flask (A) as vapor and condensed therein was about 0.3 part by weight per one part of ilmenite.

After the 5 hours of first stage leaching, the waste leach liquor was decanted out. Another 1.0 part by weight of 20% by weight HCl per one part of ilmenite, preheated to about 212° F. (100° C.), was added to flask (A) for the second stage leaching by the same procedure as the first stage leaching. The leaching time was also 5 hours and the amount of 20% by weight HCl introduced into flask (A) as vapor and condensed therein was about 0.3 part by weight per one part of ilmenite.

After separation from the waste leach liquor, the leached ilmenite was washed with water, filtered and dried. The beneficiated ilmenite product had the following weight percent analysis:

| | Percent |
|---|---|
| $TiO_2$ | 92.12 |
| $Fe_2O_3$ | 3.10 |
| FeO | 0.25 |

The beneficiated ilmenite to raw ilmenite weight ratio was 63:100. The amount of total iron extracted was 93.7% and the amount of $TiO_2$ recovered was 97.5%.

The total amount of 20% by weight HCl used, including the condensed vapor, was 2.9 parts per one part of ilmenite by weight.

Example 2

Ilmenite from Tennessee, U.S.A., having the following weight percent analysis, was pre-reduced by conventional method:

| | Percent |
|---|---|
| $TiO_2$ | 64.84 |
| $Fe_2O_3$ | 26.10 |
| FeO | 1.50 |
| $Al_2O_3$ | 0.38 |
| $SiO_2$ | 2.24 |
| $MnO_2$ | 1.9 |
| Others | Balance |

In the first stage leaching, 0.8 part by weight of 20% by weight HCl, mixed with an equal volume of waste leach liquor of the second stage leaching of a previous batch was used per one part of ilmenite by weight. The leaching apparatus and procedure were otherwise the same as in Example 1.

In the second stage leaching, 0.8 part by weight of "straight" 20% by weight HCl was used per one part of ilmenite by weight, also following the same procedure. Total hydrochloric acid vapor condensed was 0.3 part for each of the two stages of leaching. The beneficiated ilmenite had the following weight percent analysis:

| | Percent |
|---|---|
| $TiO_2$ | 91.65 |
| $Fe_2O_3$ | 3.33 |
| FeO | 0.20 |

The beneficiated ilmenite to raw ilmenite weight ratio was 69:100. The amount of total iron extracted was 91.2%, and the amount of $TiO_2$ recovered was 97.5%.

The total amount of 20% by weight HCl used, including the condensed HCl vapor, was 2.2 parts per one part of ilmenite by weight.

Example 3

Examples 1 and 2 were conducted in the laboratory. This Example 3 was conducted in a pilot plant on semi-commercial scale. The scale of major equipment related to the process of the invention was as follows:

Digester—Capable of handling up to 9 tons of ilmenite per batch. It was constructed of mild steel with rubber and acid-resistant brick linings. Operating pressure up to 50 p.s.i.g.

HCl Evaporator—Capable of evaporating 1,000 lbs. of 20% by weight HCl per hour. It was constructed of steel and graphite. Operating pressure up to 50 p.s.i.g.

The arrangement of the pilot plant equipment was essentially similar to the accompanying drawing used for illustration.

Ilmenite used for this example was from Australia, having the following weight percent analysis:

| | Percent |
|---|---|
| $TiO_2$ | 53.9 |
| $Fe_2O_3$ | 21.8 |
| FeO | 21.6 |
| Others | Balance |

The amount of ilmenite used was 18,000 lbs., which was pre-reduced by conventional method before leaching.

First stage leaching used 22,500 lbs. of 20% by weight HCl, which was not pre-heated. Heat was supplied by 20% by weight HCl vapor from the HCl evaporator. Total time for first stage leaching was 6 hours including the time for heating up the contents from room temperature to leaching temperature which was maintained at about 250° F. (121° C.) at about 30 p.s.i.g.

Second stage leaching used 19,000 lbs. of 20% by weight HCl, following the same procedure as the first stage leaching.

The amount of 20% by weight HCl introduced to the digester as vapor and condensed therein was about 4,500 lbs. for each leading stage.

After washing and dewatering of the leached ilmenite, the product was dried. It had the following weight percent analysis:

| | Percent |
|---|---|
| $TiO_2$ | 93.59 |
| $Fe_2O_3$ | 3.60 |
| FeO | 0.25 |

The beneficial ilmenite to raw ilmenite weight ratio was 55.5:100. The amount of total iron extracted was 95.4%, and the amount of $TiO_2$ recovered was 96.4%.

The total amount of 20% by weight HCl used, including the condensed HCl vapor, was 2.8 parts per one part of ilmenite by weight.

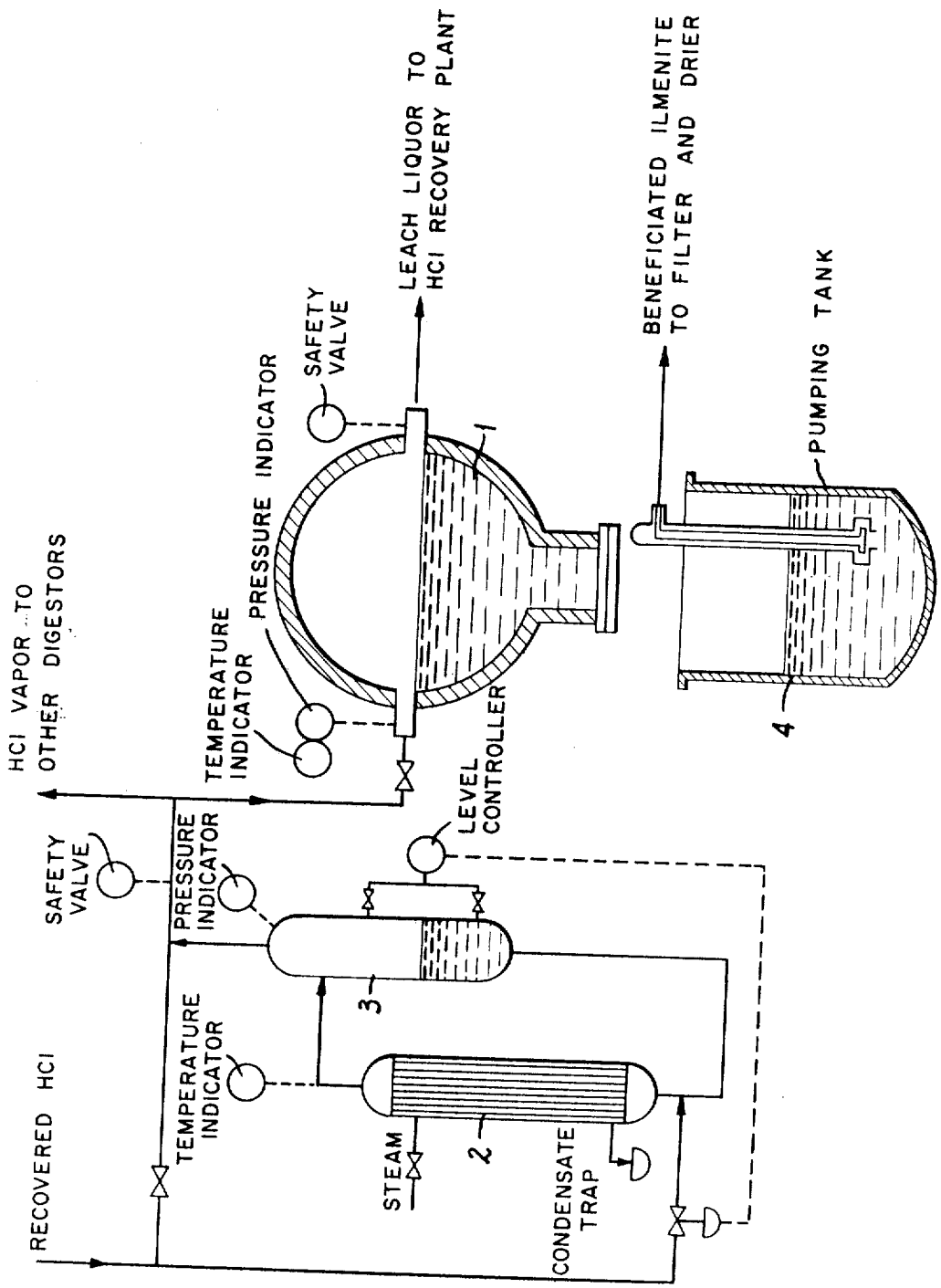

What is claimed is:

1. In a process for the benefication of titaniferous iron ores wherein said raw material is leached in a vessel at a temperature of from about 226° F. to about 300° F. and at a pressure of from about atmospheric pressure to about 50 p.s.i.g. with aqueous azeotropic liquid hydrochloric acid leach liquor having an initial hydrochloric acid concentration of about 20% by weight to provide a waste leach liquor containing acid-soluble iron contaminant values and acid-insoluble titanium values and these values are subsequently separated from one another, the improvement which comprises directly heating said aqueous azeotropic liquid hydrochloric acid leach liquor solely with vapors of an aqueous azeotropic mixture having a hydrochloric acid concentration of about 20% by weight as a heat exchange medium introduced into the vessel, said vapors having sensible heat and latent heat of condensation being generated by the evaporative boiling in a separate zone of an aqueous azeotropic mixture having a hydrochloric acid concentration of about 20% by weight.

2. The process as defined by claim 1 wherein the titaniferous iron ore is ilmenite.

3. The process as defined by claim 1 wherein the aqueous azotropic liquid hydrochloric acid leach liquor is regenerated from the waste leach liquor and recycled into the vessel.

4. The process as defined by claim 1 wherein the leaching is conducted at a pressure of from about 20 p.s.i.g. to about 50 p.s.i.g.

5. The process as defined by claim 1 wherein approximately equal amounts of an aqueous azeotropic liquid hydrochloric acid leach liquor having an initial hydrochloric acid concentration of about 20% by weight are used in two stages and the total amount of hydrochloric acid used, including the condensate of the hydrochloric acid vapor heat exchange medium, is from about 2 to about 3.5 parts by weight thereof per one part by weight of said raw material.

6. The process as defined by claim 1 wherein the leaching is conducted in two counter-current stages using approximately equal weight amounts of an aqueous azeotropic liquid hydrochloric acid leach liquor having an initial hydrochloric acid concentration of about 20% by weight in both the first and second stages and supplementing said leach liquor in the first stage with an approximately equal volume of the waste leach liquor from the second stage leaching of a previous batch of said raw material, and the total amount of hydrochloric acid used, including the condensate of the hydrochloric acid vapor heat exchange medium, is from about 2 to about 3.5 parts by weight thereof per one part by weight of said raw material.

References Cited
UNITED STATES PATENTS

| | | | |
|---|---|---|---|
| 2,527,257 | 10/1950 | Judd | 75—114 X |
| 2,804,375 | 8/1957 | Kamlet | 23—202 R |
| 3,193,376 | 7/1965 | Lo et al. | 75—114 X |
| 2,406,577 | 8/1946 | Alessandroni et al. | 423—86 |
| 3,457,037 | 7/1969 | Aramendia et al. | 423—86 |
| 3,529,931 | 9/1970 | Moklebust | 423—481 |
| 3,597,189 | 8/1971 | Sinha et al. | 75—101 R |
| 3,677,740 | 7/1972 | Williams et al. | 75—101 R X |

EDWARD STERN, Primary Examiner

U.S. Cl. X.R.

423—86, 610

PO-1050
(5/69)

UNITED STATES PATENT OFFICE
CERTIFICATE OF CORRECTION

Patent No. 3,825,419          Dated July 23, 1974

Inventor(s) James H. Chen

It is certified that error appears in the above-identified patent and that said Letters Patent are hereby corrected as shown below:

The attached Drawing Figure is missing from the Letters Patent. Col. 7, line 16, "leading" should read -- leaching --; line 24, "beneficial" should read -- beneficiated --. Col. 8, line 6, "azotropic" should read -- azeotropic --.

Signed and sealed this 10th day of September 1974.

(SEAL)
Attest:

McCOY M. GIBSON, JR.          C. MARSHALL DANN
Attesting Officer               Commissioner of Patents